United States Patent
Lee et al.

(10) Patent No.: US 11,122,324 B2
(45) Date of Patent: Sep. 14, 2021

(54) METHOD FOR DISPLAYING VIDEO RELATED SERVICE, STORAGE MEDIUM, AND ELECTRONIC DEVICE THEREFOR

(71) Applicant: SAMSUNG ELECTRONICS CO., LTD., Suwon-si (KR)

(72) Inventors: Shin-Duck Lee, Daegu (KR); Hyun-Chul Lee, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 16/482,882

(22) PCT Filed: Feb. 6, 2018

(86) PCT No.: PCT/KR2018/001589
§ 371 (c)(1),
(2) Date: Aug. 1, 2019

(87) PCT Pub. No.: WO2018/143779
PCT Pub. Date: Aug. 9, 2018

(65) Prior Publication Data
US 2020/0236422 A1    Jul. 23, 2020

(30) Foreign Application Priority Data

Feb. 6, 2017    (KR) .................. 10-2017-0016246

(51) Int. Cl.
*H04N 21/431* (2011.01)
*H04N 21/858* (2011.01)
*H04N 21/472* (2011.01)

(52) U.S. Cl.
CPC ... *H04N 21/4316* (2013.01); *H04N 21/47202* (2013.01)

(58) Field of Classification Search
CPC ......... H04N 21/4316; H04N 21/47202; H04N 21/8586; H04N 21/4725; H04N 21/44008;
(Continued)

(56) References Cited

U.S. PATENT DOCUMENTS

| | | |
|---|---|---|
| 9,448,776 B1 | 9/2016 | Sankaran et al. |
| 2013/0007827 A1 | 1/2013 | Adam et al. |

(Continued)

FOREIGN PATENT DOCUMENTS

| | | |
|---|---|---|
| KR | 10-2009-0066607 | 6/2009 |
| KR | 10-2012-0050941 | 5/2012 |

(Continued)

OTHER PUBLICATIONS

International Search Report for PCT/KR2018/001589, dated May 28, 2018, 4 pages.

(Continued)

*Primary Examiner* — Nnenna N Ekpo
(74) *Attorney, Agent, or Firm* — Nixon & Vanderhye, P.C.

(57) ABSTRACT

According to various example embodiments, an electronic device includes: a communication interface; a display; and a processor which is operatively connected to the display, wherein the processor may be configured to retrieve at least one object associated with at least one external electronic device contained in a video when playing back the video on the display, to obtain information for connecting with at least one external electronic device with respect to at least one retrieved object, and to connect with the at least one external electronic device via a communication interface in response to user input. In addition, various other embodiments are possible.

19 Claims, 13 Drawing Sheets

(58) Field of Classification Search
CPC . H04N 21/41407; G06F 16/00; G06F 16/783; G06F 16/955; G06F 16/78
See application file for complete search history.

(56) References Cited

U.S. PATENT DOCUMENTS

| | | | |
|---|---|---|---|
| 2013/0198642 A1* | 8/2013 | Carney | H04N 21/4307 715/738 |
| 2014/0157303 A1 | 6/2014 | Jo | |
| 2015/0026728 A1* | 1/2015 | Carter | H04N 21/812 725/42 |
| 2015/0046953 A1* | 2/2015 | Davidson | H04N 21/44008 725/74 |
| 2015/0350725 A1 | 12/2015 | Zhu et al. | |

FOREIGN PATENT DOCUMENTS

| KR | 10-2013-0004071 | 1/2013 |
|---|---|---|
| KR | 10-2013-0050215 | 5/2013 |
| KR | 10-2013-0085665 | 7/2013 |
| KR | 10-2015-0072465 | 6/2015 |
| KR | 10-2017-0010378 | 1/2017 |

OTHER PUBLICATIONS

Written Opinion of the ISA for PCT/KR2018/001589, dated May 28, 2018, 9 pages.

* cited by examiner

METHOD FOR DISPLAYING VIDEO RELATED SERVICE, STORAGE MEDIUM, AND ELECTRONIC DEVICE THEREFOR

CROSS-REFERENCE TO RELATED APPLICATION(S)

This application is the U.S. national phase of International Application No. PCT/KR2018/001589 filed 6 Feb. 2018, which designated the U.S. and claims priority to KR Patent Application No. 10-2017-0016246 filed 6 Feb. 2017, the entire contents of each of which are hereby incorporated by reference.

BACKGROUND

1. Field

Various embodiments of the present disclosure relate to a method of displaying a video-related service, a storage medium, and an electronic device therefor.

2. Description of the Related Art

Recently, with the popularization of Internet, contents provided through Internet by an electronic device such as a smartphone, a tablet personal computer (PC), etc., have also been diversified. A user may use an electronic device to enjoy various types of content services such as a moving image or video, etc., among which a video service is offered as a video-on-demand (VoD) service that provides videos in real time, for example, by downloading large-volume videos over an Internet network in advance and playing the videos.

When a video is played in an electronic device, for user's convenience, text-based contents may be displayed, overlaid on a video play screen. Herein, to avoid interrupting the user's viewing of the video, a background of a text overlaid on the video may be in the form of a transparent layer.

SUMMARY

Text contents related to a video, such as subtitles, etc., may be displayed through an overlay technique using a transparent layer. For example, the text contents displayed during video playback may include information inducing the user to access something or contact someone, such as a particular homepage address, contact information, etc.

Although the overlay technique provided together with a video may display additional information on the video for the user, to explore the additional information, the user needs to directly memorize the additional information and input a webpage address, contact information, etc. Moreover, to allow the user to click the additional information exposed during playback of the video, the video needs to be produced in such a way that the webpage address, the contact information, etc., are inserted into a particular position in a video producing stage.

However, production of the video including a text inducing the user to click the text in the video producing stage may cause many problems such as inevitable deformation of original video contents.

According to an embodiment of the present disclosure, an electronic device includes a communication interface, a display, and a processor functionally connected with the display in which the processor is configured to search for at least one object related to at least one external electronic device included in the video, in playback of the video on the display, to obtain information of the found at least one object for connection with the at least one external electronic device, and to connect to the at least one external electronic device through the communication interface in response to a user input.

According to an embodiment of the present disclosure, a method of displaying a video-related service includes searching for at least one object for connection with at least one external electronic device, the at least one object being included in a video, in playback of the video, displaying information for connection with the at least one external electronic device overlappingly on the video, to correspond to the found at least one object, and performing connection with the at least one external electronic device in response to a user input.

According to an embodiment of the present disclosure, a storage medium has stored therein instructions which cause, when executed by at least one processor, the at least one processor to perform at least one operation which includes searching for at least one object for connection with at least one external electronic device, the at least one external electronic device being included in a video, in playback of the video, displaying information for connection with the at least one external electronic device overlappingly on the video, to correspond to the found at least one object, and performing connection with the at least one external electronic device in response to a user input.

According to various embodiments of the present disclosure, a method of displaying a video-related service, a storage medium, and an electronic device therefor are provided to provide additional information related to a video through an overlay technique using a transparent layer.

According to various embodiments of the present disclosure, a method of displaying a video-related service, a storage medium, and an electronic device therefor are provided to allow a user to easily select hyperlink information during playback of a video.

According to various embodiments of the present disclosure, by displaying information enabling movement to a detailed information page related to a video in the form of a hyperlink through an overlay technique using a transparent layer, a user's selection may be induced.

According to various embodiments of the present disclosure, a user may click additional information while watching a video, thus improving a user's convenience.

According to various embodiments of the present disclosure, information inducing a user's selection, such as a webpage address, an e-mail, a phone number, etc., included in a video to be played in an electronic device may be searched for and displayed through an overlay technique, thus providing a hyperlink without deformation of original video contents.

According to various embodiments of the present disclosure, by playing a video including a hyperlink, user inconvenience may be minimized when compared to banner-type advertisements and an advertisement effect may be increased without addition of a production cost to an advertiser.

DETAILED DESCRIPTION

Figure 1:
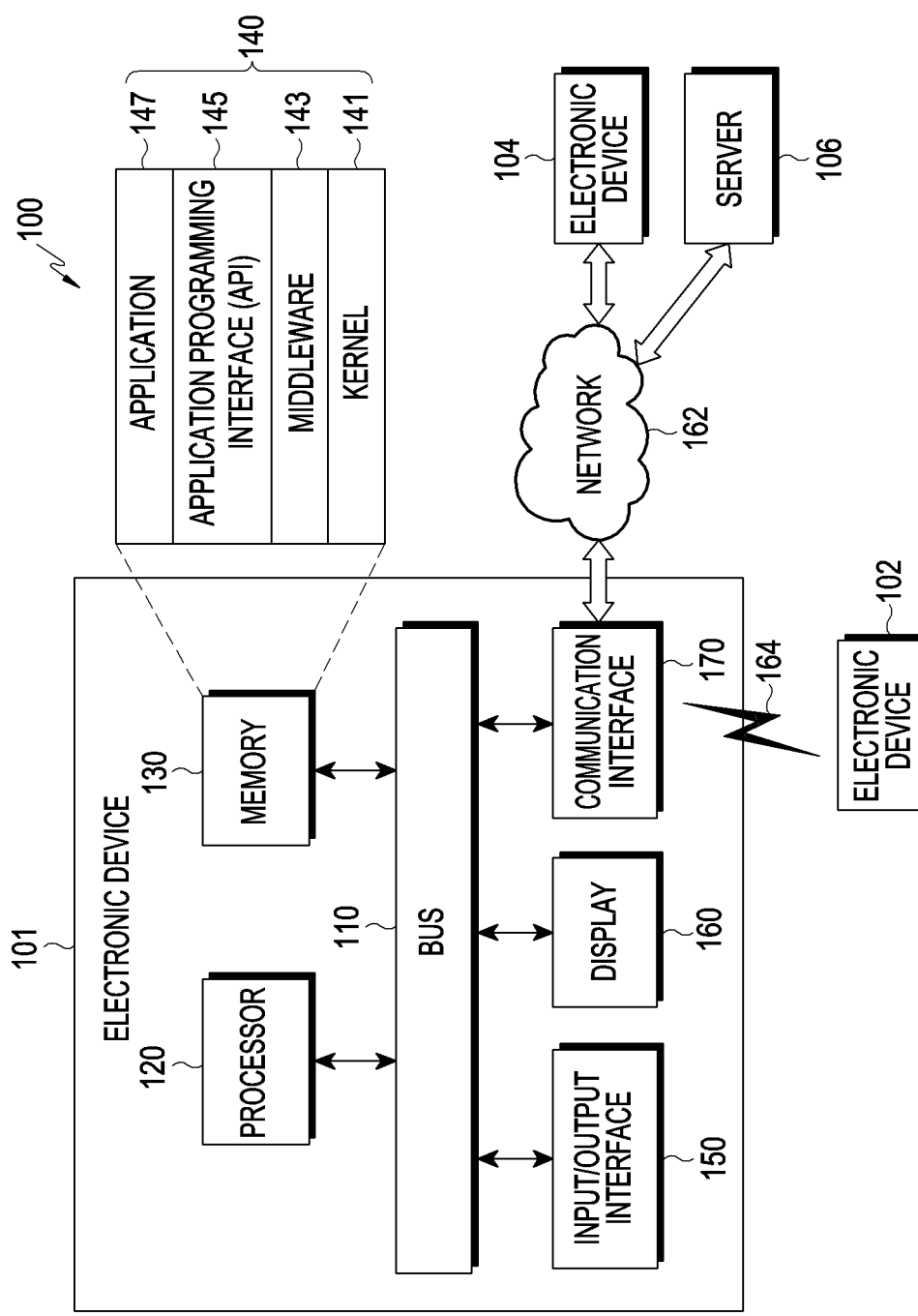
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message or data) between the elements 110 to 170.

The processor 120 may control overall operations of the electronic device 101.

The processor 120 may include one or more of a central processing unit (CPU), an application processor (AP), and a communication processor (CP). The processor 120 may perform operations or data processing for control or communication of, for example, at least one other elements of the electronic device 101. The processor 120 loads an instruction or data received from at least one of other elements (e.g., a non-volatile memory) into a volatile memory to process the instruction or data, and stores result data in the non-volatile memory.

The memory 130 may include a volatile or nonvolatile memory. The memory 130 may store, for example, instructions or data associated with at least one other elements of the electronic device 101. According to an embodiment, the memory 130 may store software or a program 140. The program 140 may include at least one of, for example, a kernel 141, middleware 143, an application programming interface (API) 145, or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

For example, the internal memory 130 may include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD).

The memory 130 may store images for providing a graphic user interface (GUI) associated with one or more applications, user information, data or a database such as documents, etc., background images (a menu screen, an idle screen, etc.) or operating programs necessary for driving the electronic device 101, images captured by a camera, etc.

The memory 130 may store a video downloaded in advance through an Internet network or temporarily store a video transmitted in real time over the Internet network.

According to an embodiment of the present disclosure, the memory 130 may store software or a program for providing additional information related to a video. For example, the memory 130 may store an image recognition algorithm used for extracting text-type link information included in a video.

The processor 120 may display a video on which the transparent layer is overlaid, the video being configured by associating a selectable visual element with a text-type link region recognized in the video by using data stored in the memory 130.

The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wireless communication may include a cellular communication protocol using at least one of, for example, long-term evolution (LTE), LTE advance (LTE-A), LTE in unlicensed spectrum (LTE-U), licensed assisted access (LAA), code division multiple access (CDMA), wideband CDMA (WCDMA), universal mobile telecommunications system (UMTS), wireless broadband (WiBro), global system for mobile communications (GSM), or the like. According to an embodiment, the wireless communication may include at least one of Wireless Fidelity (WiFi), Light Fidelity (LiFi), Bluetooth, Bluetooth Low Energy (BLE), Zigbee, near field communication (NFC), magnetic secure transmission (MST), radio frequency (RF), or a body area network (BAN), as illustrated by an element 164 of FIG. 1. According to an embodiment, the wireless communication may include a global navigation satellite system (GNSS). Hereinbelow, "GPS" may be used interchangeably with "GNSS". The wired communication may include, for example, at least one of a universal serial bus (USB), a high definition multimedia interface (HDMI), a recommended standard (RS)-232, power line communication, a plain old telephone service (POTS), and so forth. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102, 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

According to an embodiment of the present disclosure, an electronic device (e.g., the electronic device 101) may include a communication interface (e.g., the communication interface 170), a display (e.g., the display 160), and a processor (e.g., the processor 120) functionally connected with the display, in which the processor (e.g., the processor 120) may be configured to search for (or discover) at least one object related to at least one external electronic device included in the video in video playback on the display (e.g., the display 160), to obtain information of the found at least one object for connection with the at least one external electronic device, and to connect to the at least one external electronic device through the communication interface (e.g., the communication interface 170) in response to a user input.

For example, the video may be displayed or played according to a frame per sec (FPS), and a still image may be one frame of a video frame. More specifically, a processor (e.g., the processor 120) may search for in and extract from the still image, information enabling movement to a detailed information page related to the video, e.g., a universal resource locator (URL), a text in the form of a phone number, a predefined symbol, etc. To this end, the processor (e.g., the processor 120) may recognize information enabling movement to a detailed information page related to the video in an image frame, e.g., a video scene, based on an image recognition algorithm.

According to an embodiment of the present disclosure, an object included in the video indicates information enabling movement to a detailed information page related to the video, and may include at least one of, for example, a webpage address, a phone number, an e-mail, a logo, etc. In addition, any information may be used for connection with at least one external electronic device when the information includes a representative object, such as a letter style, a symbol mark, a landmark image, etc., the public may recognize, so that the representative object is used like a trademark to reveal a name of a company or a product.

According to an embodiment of the present disclosure, the processor (e.g., the processor 120) may include information of the found at least one object for connection with the at least one external electronic device on a first layer, and control the first layer to be displayed overlaid on the video.

According to an embodiment of the present disclosure, the processor (e.g., the processor 120) may control the information of the found at least one object for connection with the at least one external electronic device to be displayed on the video by using a selectable visual element. For example, by displaying information enabling movement to the detailed information page related to the video by using a selectable visual element such as a hyperlink, an icon, inversion, a transparency, highlights, color change, a contour, etc., through an overlay technique using a transparent layer, a user's selection may be induced.

According to an embodiment of the present disclosure, the processor (e.g., the processor 120) may control a screen corresponding to connection with the at least one external electronic device to be displayed in response to the user input with respect to the information for connection with the at least one external electronic device. For example, in response to a user input such as user's selection of a webpage address when the webpage address, etc., is displayed overlaid on the video, a video play screen may be switched to a webpage screen along with movement to the webpage address, and the webpage screen may be displayed. According to an embodiment of the present disclosure, a link screen including a guide window asking whether to stop playing the video and move to the webpage is displayed before movement to a screen of the webpage, and then the screen of the webpage may be displayed in response to an additional user input.

According to an embodiment of the present disclosure, the processor (e.g., the processor 120) may search for at least one object in a selected frame at designated intervals in video playback. More specifically, the processor (e.g., the processor 120) may perform a search for an object included in the video in the unit of the number of predefined frames at designated intervals. For example, the processor (e.g., the processor 120) may perform a search with respect to the first frame among a plurality of frames to be played per second.

According to an embodiment of the present disclosure, when the processor (e.g., the processor 120) obtains information for connection to a detailed information page by performing image recognition with respect to the first frame every second in video playback, the processor may display a layer on which the obtained information for connection to the detailed information page is configured in the form of a hyperlink, overlaid on the video. The processor (e.g., the processor 120) may perform image recognition with respect to the first frame at designated intervals when the layer is displayed overlaid on the video, and may remove the layer from a video screen when there is no found object. According to an embodiment of the present disclosure, the designated interval may be each second. For example, for the video, a URL, an e-mail, a phone number, etc., are generally exposed within five seconds, such that a link may be formed in real time through the aforementioned search.

According to an embodiment of the present disclosure, the processor (e.g., the processor 120) may search for at least one object in a frame corresponding to a user's selection among frames included in the video in video playback. For example, by touching a part of the video screen displayed on the display (e.g., the display 160), the user may select at least one object included in the scene of the video. The processor (e.g., the processor 120) may receive a user input through the I/O interface 150, the communication interface 170, a sensor unit (not shown), a camera (not shown), etc., as well as a direct screen touch during display of the video screen. The user may select information for connection to a detailed information page, a button indicating the information, an icon, or a menu item through the I/O interface 150 or the display 160, input a voice command through a microphone of the I/O interface 150, perform a gesture or a motion input through the camera (not shown) of the electronic device 101, or wirelessly input an execution command through the communication interface 170.

According to an embodiment of the present disclosure, the processor (e.g., the processor 120) may search for at least one object in a frame corresponding to a time point when a user input is generated, in response to the user input. In this case, the processor (e.g., the processor 120) may perform image recognition with respect to the entire frame region corresponding to a time point when the user input is generated. The processor (e.g., the processor 120) may perform image recognition with respect to a region having a size around a position where the user input is generated within the frame corresponding to the time point when the user input is generated.

As stated above, the processor (e.g., the processor 120) according to various embodiments of the present disclosure may search for at least one object in a selected frame at designated intervals in video playback or a frame corresponding to a user's selection.

According to an embodiment of the present disclosure, the processor (e.g., the processor 120) may extract a text corresponding to the information for connection with the at least one external electronic device, based on the image recognition algorithm. The processor (e.g., the processor 120) may obtain (or extract) a predefined symbol, etc., such as a logo, a symbol mark, etc., corresponding to the information for connection with the at least one external electronic device based on the image recognition algorithm. Thus, the processor (e.g., the processor 120) may set a hyperlink for movement to the detailed information page to correspond to the obtained text or symbol.

According to an embodiment of the present disclosure, information for connection with two or more detailed information pages may be included in the video screen. Thus, when two or more objects are found in one frame, the processor (e.g., the processor 120) may control information for connection with a first external electronic device corresponding to a first object among the found at least one object to be included in a position corresponding to the first object on the first layer, information for connection with a second external electronic device corresponding to a second object among the found at least one object to be included in a position corresponding to the second object on a second layer, and the first layer and the second layer to be displayed overlaid on the video. The processor (e.g., the processor 120) may set connection with an external electronic device corresponding to an object selected by the user input from among the at least one object. Thus, the user may select any one of two or more connectable detailed information pages when the two or more connectable detailed information pages are displayed on the video screen. For example, when a phone number and a webpage address are displayed overlaid on the video, the user may select a desired connection scheme. Thus, when the user's selection is a selection of a phone number, the processor (e.g., the processor 120) may display a call connection screen by performing connection to the selected phone number; when the user's selection is a selection of a webpage, the processor (e.g., the processor 120) may display a movement screen to the webpage.

According to various embodiments of the present disclosure, additional information inducing a user's click may be displayed on the video without deforming the video in an electronic device to allow the user to click additional information exposed in video playback, such that there is no need to insert separate webpage address or contact information into a designated position to produce the video in the video production stage. Hence, the advertiser may improve an advertisement effect by easily inducing the user's click while avoiding obscuring the video screen without additional advertisement production cost.

Figure 2:
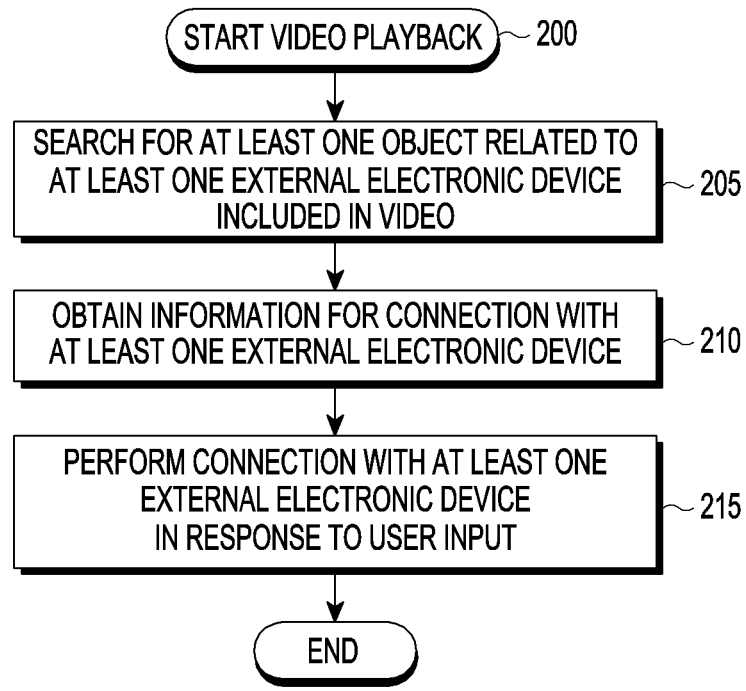
FIG. 2 is an operating flowchart for displaying selectable link information associated with a video in an electronic device according to various embodiments of the present disclosure.

FIG. 2 is an operating flowchart for displaying selectable link information associated with a video in an electronic device according to various embodiments of the present disclosure. A method of displaying selectable link information on a video may include operations 200 through 215, and may be performed by at least one of the electronic device (e.g., the electronic device 101 or 102), the processor (e.g., the processor 120) of the electronic device, or the controller of the electronic device.

Referring to FIG. 2, in operation 200, the electronic device (e.g., the processor 120) may start playing the video in response to a user's video play request. According to various embodiments of the present disclosure, the electronic device (e.g., the processor 120) may display the video on the display (e.g., the display 160). The electronic device (e.g., the processor 120) may search for at least one object related to at least one external electronic device included in the video in operation 205. Herein, the at least one object may include additional information displayed on the video screen in relation to the video, for example, additional information for communication connection with at least one external electronic device, such as a communication server, an e-mail server, etc. The additional information related to the video may be displayed in various forms such as a URL, a phone number, an e-mail, a logo, etc.

According to various embodiments of the present disclosure, the electronic device (e.g., the processor 120) may obtain an object corresponding to a URL, a phone number, an e-mail, a logo, etc., from the video displayed on the screen, based on the image recognition algorithm.

In operation 210, the electronic device (e.g., the processor 120) may obtain information for connection with the at least one external electronic device through the search. For example, when at least one of a URL, a phone number, an e-mail, a logo, etc. is found, the electronic device (e.g., the processor 120) may obtain information for connection with at least one external electronic device to set a link, e.g., a hyperlink, for movement to a detailed information page for the found object. The electronic device (e.g., the processor 120) may search for a text in the form of a webpage address or contact information by performing image recognition in a frame of the video, i.e., a still image, and obtain connection information.

According to various embodiments of the present disclosure, a webpage address or contact information may be extracted using a previously stored symbol to extract link information in the form of a text from a frame of the video. For example, for a webpage in the form of a URL, two slashes (//) may be sequentially recognized such that a webpage address may be obtained by recognizing 'www.' from a continuous character string. For contact information such as an e-mail address, the e-mail address may be obtained using a previously stored e-mail format such as '@', 'samsung.com', etc. For contact information such as a phone number, the phone number may be obtained using a hyphen (-), consecutively continuous numbers, etc. For a logo, link information such as an URL, contact information, etc., may be obtained by identifying an URL address mapped corresponding to a previously stored logo. In this way, the electronic device (e.g., the processor 120) may obtain information for connection with at least one external electronic device.

According to an embodiment of the present disclosure, when obtaining link information such as a webpage address, contact information, etc., the electronic device (e.g., the processor 120) may set a hyperlink to move to a webpage or contact information when the user touches the obtained link information.

In operation 215, the electronic device (e.g., the processor 120) may perform connection with the at least one external electronic device in response to the user input. For example, as the user touches a scene of the video on which the link information is displayed overlaid, connection to a webpage, an e-mail, or a phone number, may be made without a separate input process.

According to an embodiment of the present disclosure, the electronic device (e.g., the processor 120) may search for additional information related to the video in at least one frame of the video, generate a transparent layer that provides the found at least one additional information using a selectable visual element, and display the transparent layer overlappingly on the video. Herein, the selectable visual element may be configured by setting link information related to the video in the form of a hyperlink and may include various visual effects allowing user's election.

FIGS. 3A through 3E illustrate examples of a screen where a transparent layer is displayed overlaid on a video according to various embodiments of the present disclosure.

Figure 3A:
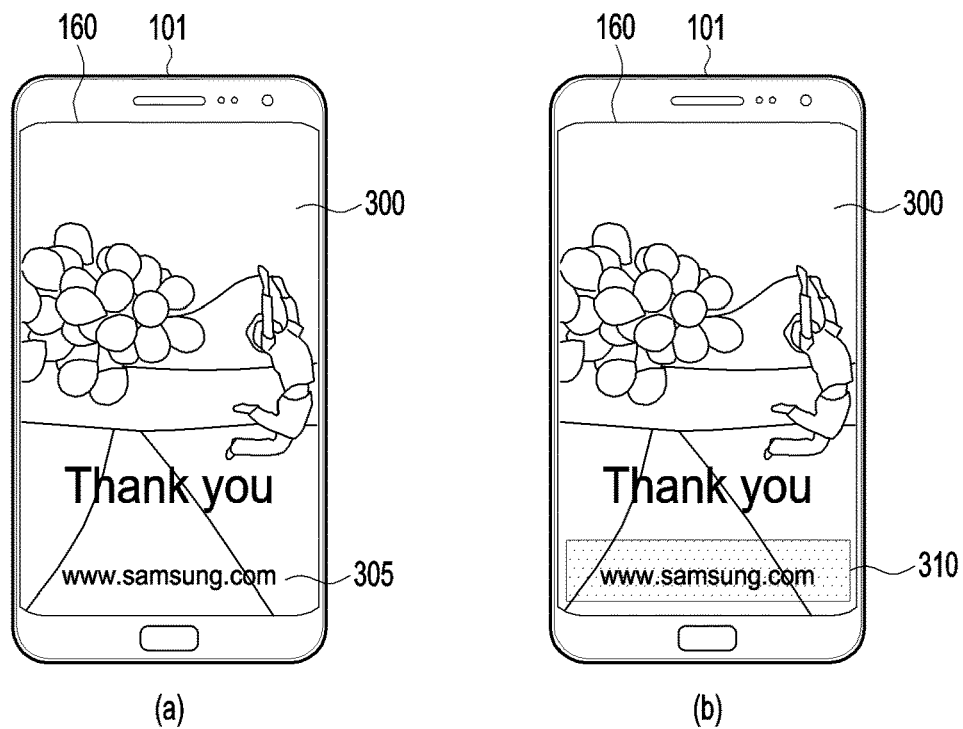
FIGS. 3A, 3B, 3C, 3D, and 3E illustrate examples of a screen where a transparent layer is displayed, overlaid on a video according to various embodiments of the present disclosure.

Referring to FIG. 3A(a), a video may be displayed or played on the display 160 of the electronic device 101 in video playback. As an object for communication connection to at least one external electronic device, e.g., a web server, for example, an Internet site address 305 may be included in a video scene as shown in FIG. 3A(a), and an Internet site address region 310 in which a hyperlink is set may be displayed overlaid on the video by using a selectable visual element corresponding to the Internet site address 305 to enable the user to select the Internet site address 305 as shown in FIG. 3A(b).

FIG. 3A(b) shows a case where the Internet site address 305 is displayed in an emphasized manner such as using highlighting, activating, etc., such that the Internet site address 305 may be selected. By selecting the hyperlinked Internet site address 305, the user may connect to a corresponding Internet site without a separate process of inputting a URL.

Figure 3B:
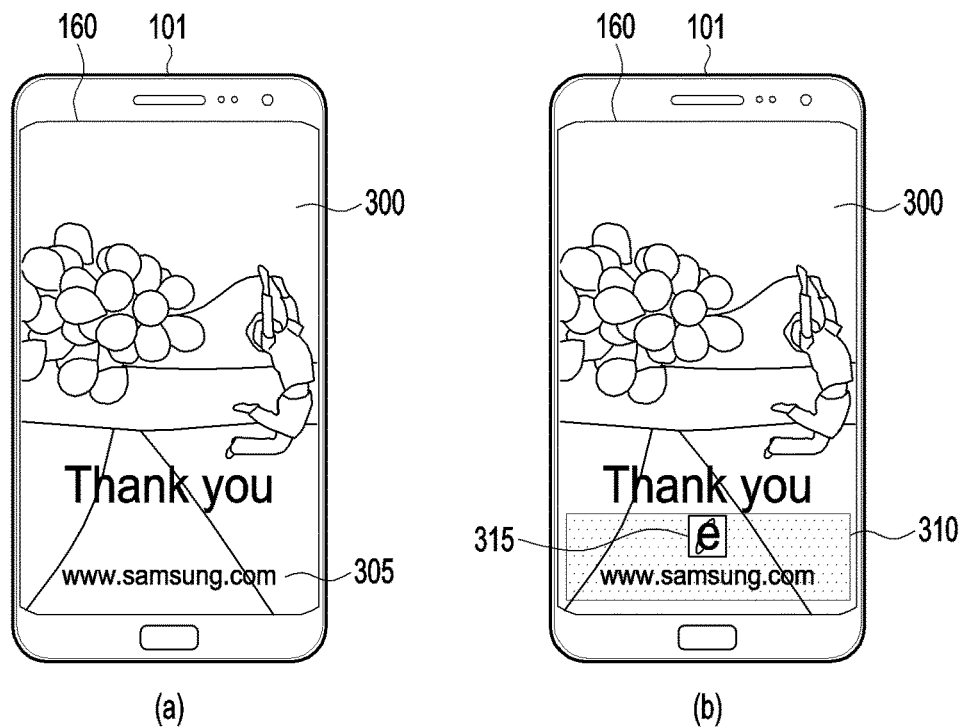

As the Internet site address region 310 is activated as shown in FIG. 3B(b) to correspond to the Internet site address 305 in a video play screen 300 as shown in FIG. 3A(a), an explorer indicator 315 in the form of 'e' may be displayed together.

Figure 3C:
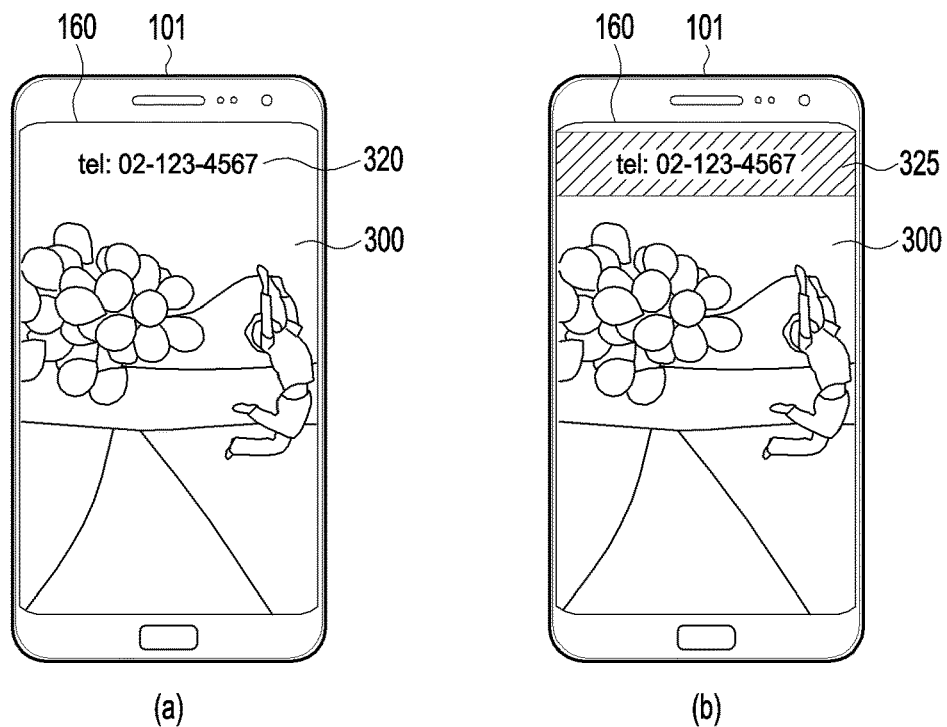

To correspond to a phone number 320 in the video play screen 300 as shown in FIG. 3C(a), a phone number region 325 may be activated and displayed as shown in FIG. 3C(b).

Figure 3D:
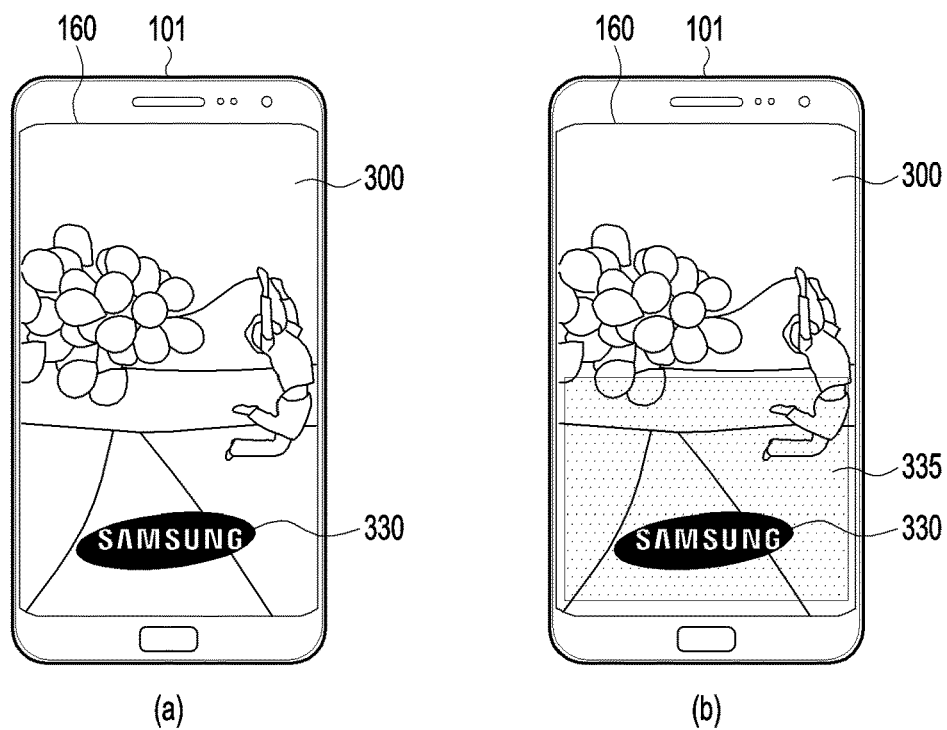

In the video screen 300 including a representative logo 330 of a company as shown in FIG. 3D(a), the representative logo 330 may be activated and displayed as shown in FIG. 3D(b), and it may be indicated that the representative logo 330 is selectable, by using inversion, color change, etc., for the representative logo 330, and it may also be indicated that a partial region 335 including the representative logo 330 is selectable, by using a transparency, highlights, etc., for the partial region 335.

Figure 3E:
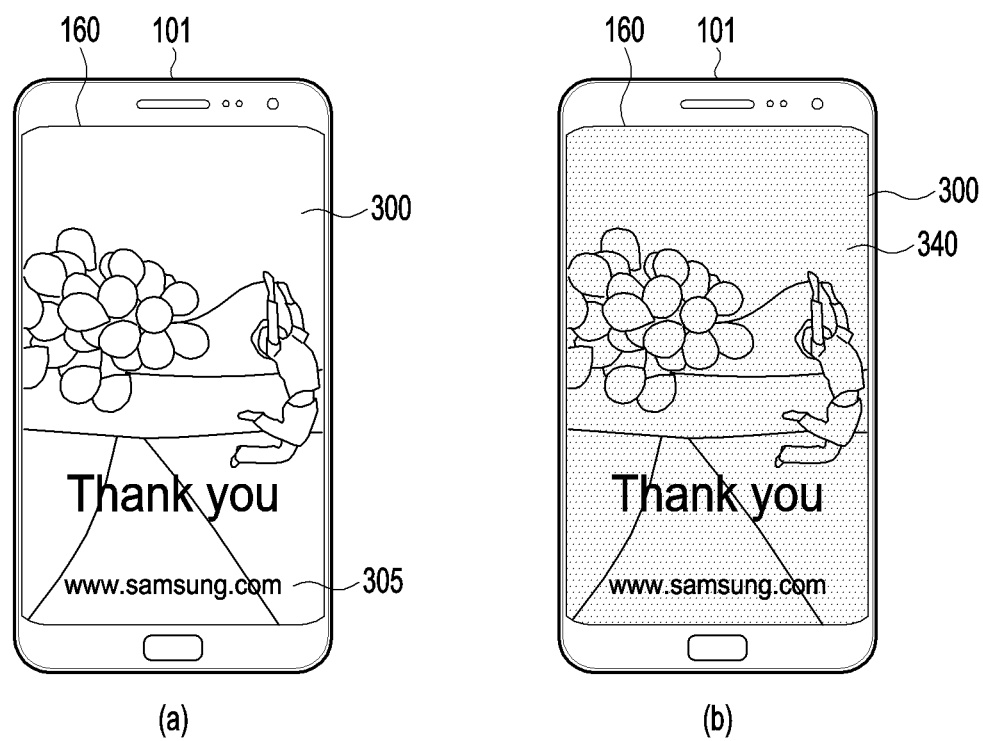

To allow the user to select the Internet site address 305 as shown in FIG. 3E(a), an entire region 340 in the video screen 300 may be activated as shown in FIG. 3E(b). Thus, the user may connect to the Internet site address through a selection in the active region 340 without selecting a part where the Internet site address 305 is displayed.

According to an embodiment of the present disclosure, various visual effects capable of inducing a user's selection with respect to link information displayed on the video may be used.

According to an embodiment of the present disclosure, the processor (e.g., the processor 120) may display that an additional information (or link information) display region of a transparent layer is selectable using at least one of a transparency, highlights, inversion, color change, or a contour. For example, to allow linkable additional information to be distinguished from an image, a transparency, highlights, etc., of a display region of the additional information may be adjusted. For example, a display region of additional information may be inverted, and a color may be adjusted stepwise during inversion. Depending on a video play time, a color of the display region of the additional information or a background color may be changed into a different color. For example, a thickness, a type, or a color of a contour of the display region of the additional information may be changed differently according to the video play time.

According to an embodiment of the present disclosure, the processor (e.g., the processor 120) may display the display region of the additional information by changing at least one display degree, e.g., a size or a ratio of the display region of the additional information. Over the play time, the display region of the additional information may be displayed by stepwise enlarging or reducing the size of the display region.

According to an embodiment of the present disclosure, the processor (e.g., the processor 120) may display an identifiable object on a part of the display region of the additional information, such that the object may be distinguished from a currently played video. For example, an identifier 'e' indicating Explorer may be displayed for a webpage address, an identifier shaped like a phone may be displayed for a phone number, and an identifier '@' may be displayed for an e-mail. By displaying an identifiable object during video playback, the user may be led to select a displayed object.

According to an embodiment of the present disclosure, the processor (e.g., the processor 120) may perform connection to link information included in the display region of the additional information when a selection with respect to the display region of the additional information is input. Thus, when the user selects a part of the video screen, e.g., the display region of the additional information, the processor may switch to a screen corresponding to the link information included in the display region of the additional information.

Figure 4:
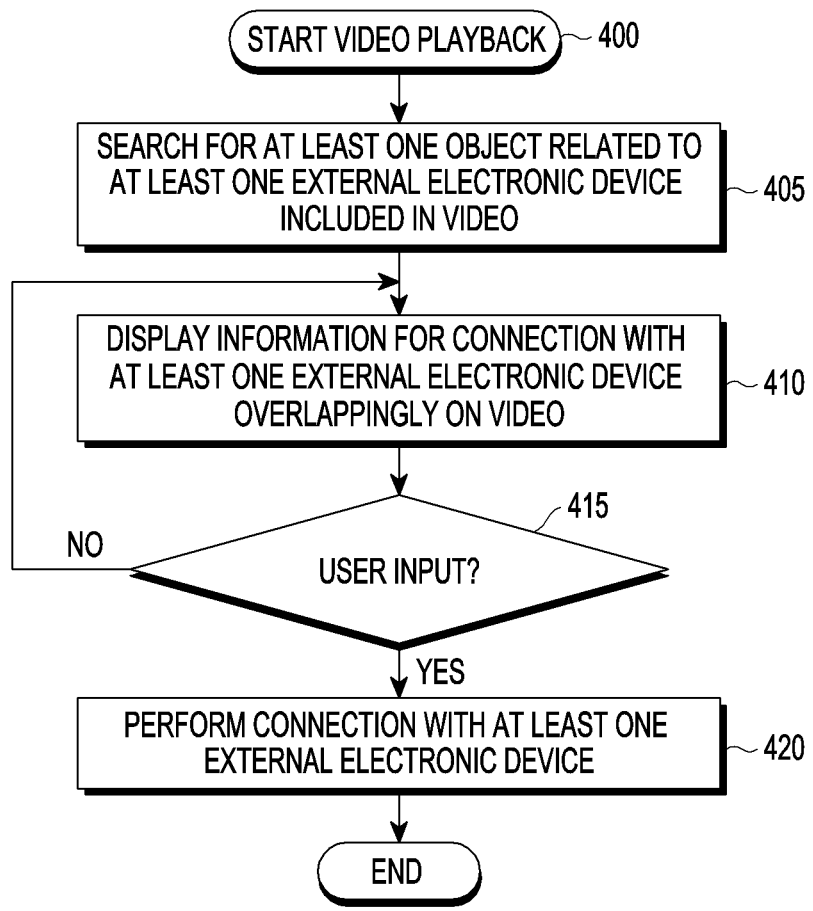
FIG. 4 is an operating flowchart based on selection of link information related to a video in an electronic device according to various embodiments of the present disclosure.

FIG. 4 is an operating flowchart based on selection of link information associated with a video in an electronic device according to various embodiments of the present disclosure. In operation 400, the electronic device (e.g., the processor 120) may start playing the video in response to a user's video play request. The electronic device (e.g., the processor 120) may display the video on the display (e.g., the display 160). The electronic device (e.g., the processor 120) may search for at least one object related to at least one external electronic device included in the video, in operation 405.

The search for the at least one object may be performed at specific intervals, i.e., designated intervals, during video playback, or may be performed at a timepoint when a user's request is input.

According to an embodiment of the present disclosure, an operation of searching for an object for connection with at least one external electronic device may include searching for at least one object in a selected frame at designated intervals in video playback. More specifically, a search for at least one object, i.e., an image portion indicating link information may be performed using an interval between equally divided frames per second. For example, a search may be performed with respect to the first frame among a plurality of frames to be played per second.

According to an embodiment of the present disclosure, the operation of searching for an object for connection with at least one external electronic device may include searching for the at least one object in a frame corresponding to a user's selection among frames included in the video in video playback. More specifically, an operation of searching for an image portion indicating at least one link information may be performed at a timepoint when a user's request for a part of the video is received during video playback.

According to an embodiment of the present disclosure, the electronic device (e.g., the processor 120) may operate based on the image recognition algorithm to search for an image portion including information enabling connection with at least one external electronic device in the video.

According to an embodiment of the present disclosure, information for connection with the at least one external electronic device may include a text extracted corresponding to the found at least one object based on the image recognition algorithm.

According to an embodiment of the present disclosure, the electronic device (e.g., the processor 120) may search for a text or a symbol in the form of a webpage address or contact information by performing image recognition in a frame of the video, i.e., a still image, and obtain information for connection with the external electronic device.

For example, a webpage address or contact information may be extracted using a previously stored symbol to extract link information in the form of a text, a logo, or a symbol from a frame of the video. For example, for a webpage in the form of a URL, two slashes (//) may be sequentially recognized such that a webpage address may be obtained by recognizing 'www.' from a continuous character string. For contact information such as an e-mail address, the e-mail address may be extracted using a previously stored e-mail format such as '@', 'samsung.com', etc. For contact information such as a phone number, the phone number may be extracted using a hyphen (-), consecutively continuous numbers, etc.

According to an embodiment of the present disclosure, when obtaining link information such as a webpage address, contact information, etc., the electronic device (e.g., the processor 120) may set a hyperlink to move to a webpage or contact information when the user touches the obtained link information. A transparent layer may be generated to enable a user's selection with respect to hyperlinked link information, and a selectable visual element for the link information may be positioned on the transparent layer. According to an embodiment of the present disclosure, the selectable visual element may be positioned in a position corresponding to the found link image portion on the transparent layer.

In operation 410, the electronic device (e.g., the processor 120) may display information for connection with the at least one external electronic device overlappingly on the video to correspond to the found object.

According to an embodiment of the present disclosure, the processor (e.g., the processor 120) may generate a layer including information for connection with the at least one external electronic device in a position corresponding to the found at least one object and display the layer overlappingly on the video. Herein, the information for connection with the at least one external electronic device may include at least one of a webpage address, a phone number, an e-mail, or a logo.

According to an embodiment of the present disclosure, the electronic device (e.g., the processor 120) may display a layer overlappingly on the video when the at least one object is found, and may remove the layer from the video screen when the at least one object is not found.

In operation 415, the electronic device (e.g., the processor 120) may determine whether a user input is received. Herein, the user input may be an input for selecting information for connection with at least one external electronic device in a video screen or a region where the information is displayed. When a finger approaches the screen by a specific distance therebetween without contacting the screen, the electronic device (e.g., the processor 120) may determine that the user input is input. The user input may be input through a gesture to select the screen through the camera (not shown) as well as the above-described manner.

According to an embodiment of the present disclosure, when the user input is input, the electronic device (e.g., the processor 120) may perform connection with the at least one external electronic device in response to the user input, in operation 420. According to an embodiment of the present disclosure, the electronic device (e.g., the processor 120) may display a screen corresponding to connection with the at least one external electronic device in response to the user input with respect to the information for connection with the at least one external electronic device.

According to an embodiment of the present disclosure, the electronic device (e.g., the processor 120) may perform connection based on information for connection with the at least one external electronic device included in an image portion. For example, when a webpage address is included in the found image portion, connection to a webpage corresponding to the webpage address may be performed while a screen of the connected webpage may be displayed. When contact information such as an e-mail is included in the found image portion, a screen for writing the e-mail may be displayed. When contact information such as a phone number is included in the found image portion, upon selection of the phone number by the user, an application may be executed to directly dial the phone number, to send a message to the phone number, or to display a screen configured to edit the phone number.

FIGS. 5A through 5D illustrate examples of a screen corresponding to selection of link information included in a video according to various embodiments of the present disclosure.

Figure 5A:
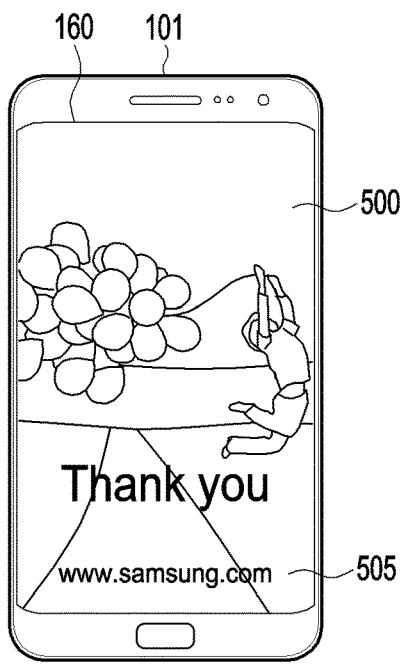
FIGS. 5A, 5B, 5C, and 5D illustrate examples of a screen corresponding to selection of link information included in a video according to various embodiments of the present disclosure.
Figure 5B:
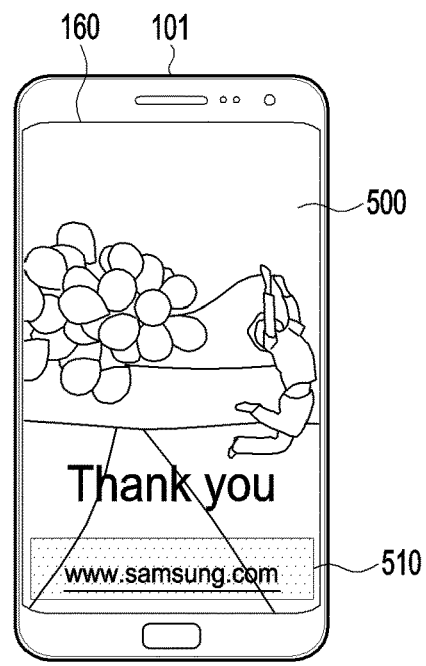

FIG. 5A illustrates a case where a video 500 including an Internet site address 505 is displayed on the display 160 of the electronic device 101. To enable a user's selection with respect to the video 500 including the Internet site address 505, an Internet address region 510 may be activated and displayed as shown in FIG. 5B.

Figure 5C:
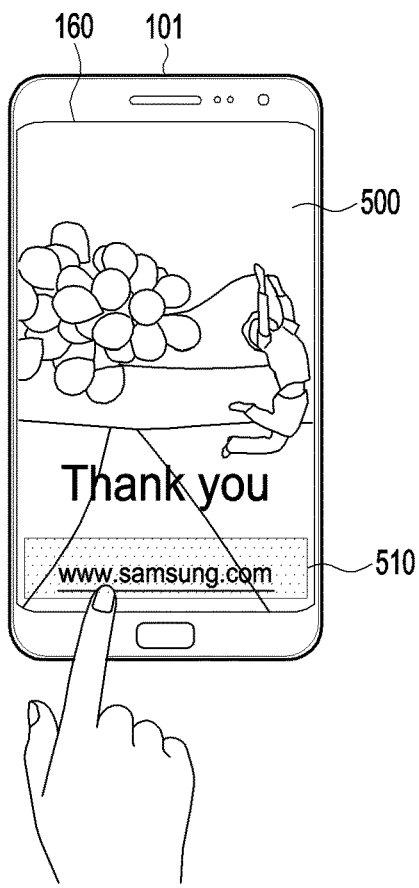
Figure 5D:
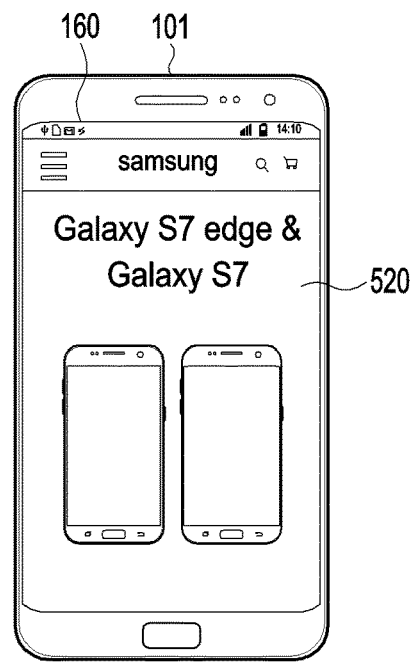

As the Internet address region 510 is activated as shown in FIG. 5C, the user may select the Internet address region 510, such that a screen 520 corresponding to an Internet address may be displayed corresponding to a user's selection as shown in FIG. 5D. In this case, to determine whether to maintain video playback in response to the user input of selecting the Internet address, the electronic device (e.g., the processor 120) may output a guide window asking whether to move to a screen corresponding to the Internet address after pausing video playback or to move to the screen corresponding to the Internet address after terminating video playback.

Figure 6:
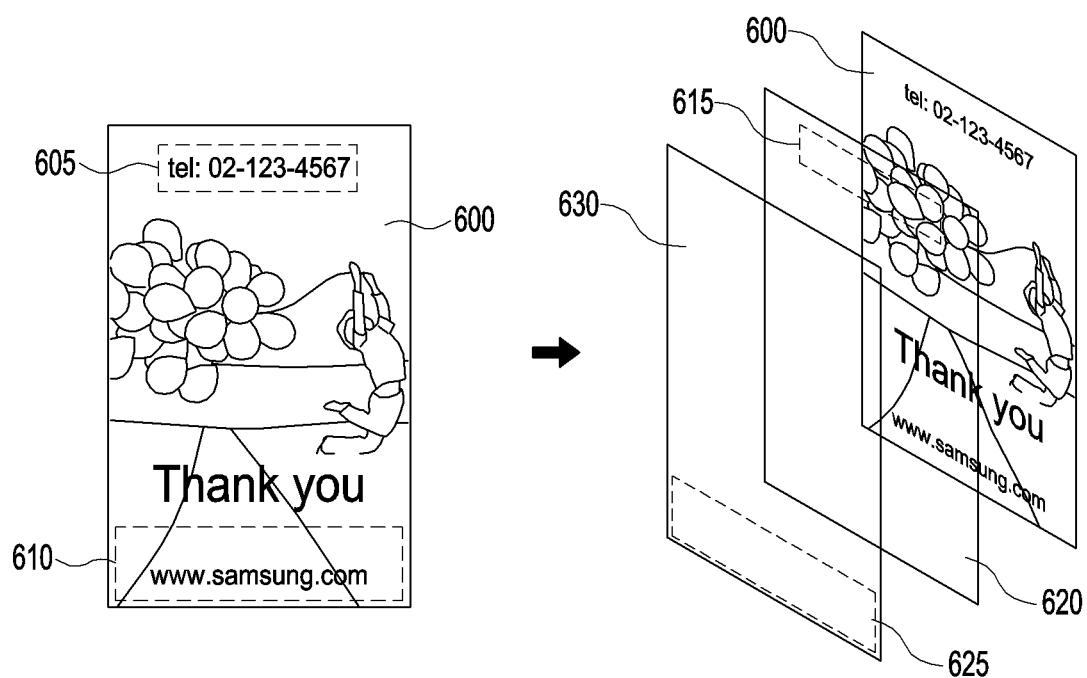
FIG. 6 illustrates a configuration of a layer displayed overlaid on a video according to various embodiments of the present disclosure.

FIG. 6 illustrates a configuration of a layer displayed overlaid on a video according to various embodiments of the present disclosure.

Referring to FIG. 6, at least one object, e.g., a phone number 605 and an Internet address 610 may be included in a video screen 600. That is, one or more link information may be included in one scene. In FIG. 6, a layer architecture of a video including link information is illustrated, and the video screen 600 may include a layer in which the video layer overlaps at least one object.

According to an embodiment of the present disclosure, when there are a plurality of objects, a layer 620 including an active region 615 corresponding to the phone number 605 and a layer 630 including an active region 625 corresponding to the Internet address 610 may be overlaid on a video layer, as shown in FIG. 6. The two active regions 615 and 625 may be configured not to overlap so as to identify a user input. For example, for a video screen where a phone number and an Internet address are arranged adjacent to each other, the active regions 615 and 625 may be configured to allow the user to select any one of them.

According to an embodiment of the present disclosure, it is illustrated in FIG. 6 that a layer is generated for each of the plurality of objects, but an active region may be set corresponding to each of the plurality of objects in one layer.

Figure 7:
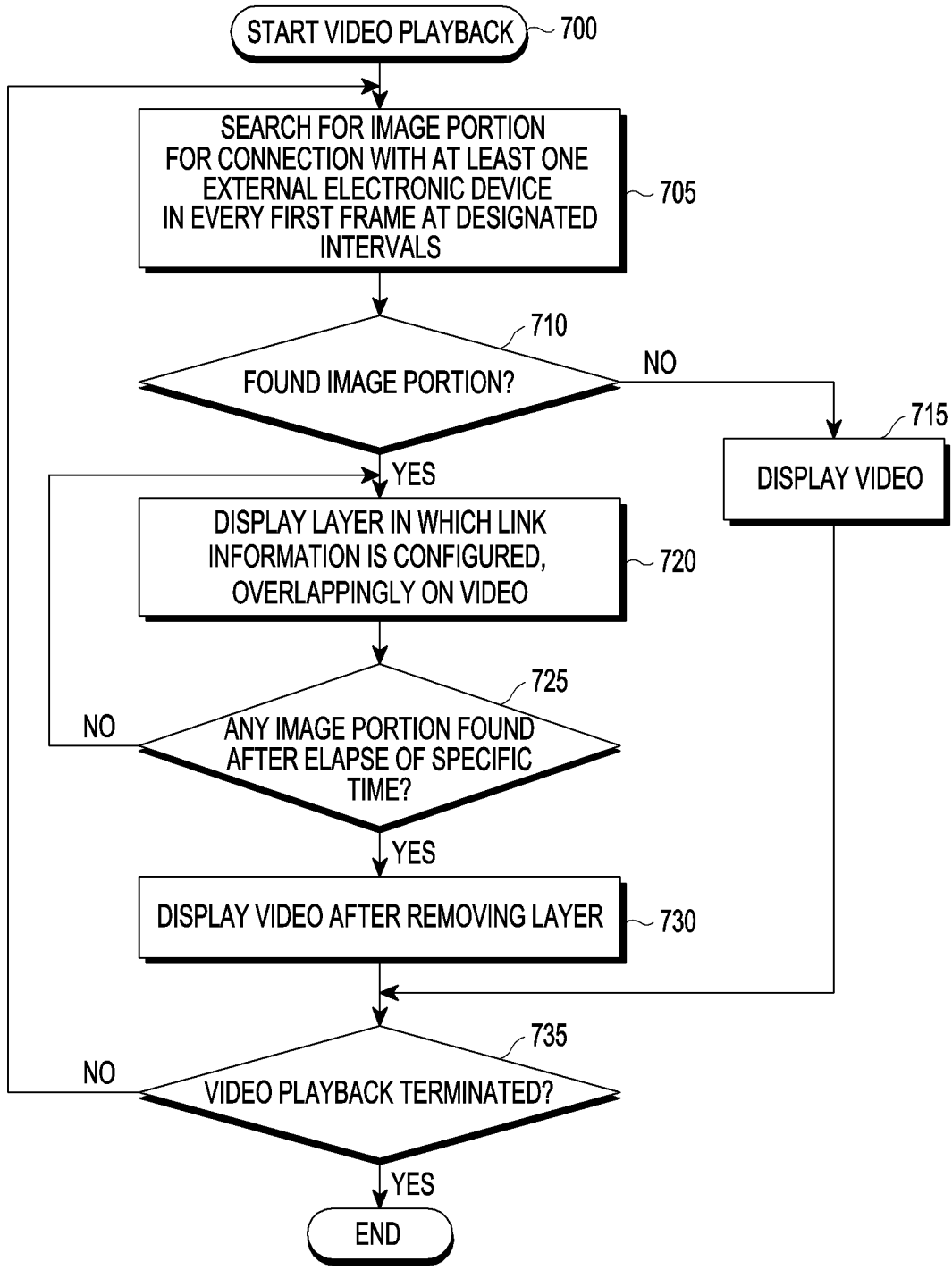
FIG. 7 is an operating flowchart for searching for a link image portion included in a video according to various embodiments of the present disclosure.

FIG. 7 is an operating flowchart for searching for a link image portion included in a video according to various embodiments of the present disclosure.

Referring to FIG. 7, once starting video playback in operation 700, the electronic device (e.g., the processor 120) may search for an image portion for connection with at least one external electronic device in the first video frame at designated intervals, in operation 705. According to an embodiment of the present disclosure, the designated interval may be each second or a designated second unit.

In operation 710, the electronic device (e.g., the processor 120) may determine whether an image portion is found in the first video frame at designated intervals, e.g., per second. When no image portion is found, the electronic device (e.g., the processor 120) may display or play a video on the display (e.g., the display 160) in operation 715. When an image portion is found in operation 710, the electronic device (e.g., the processor 120) may display a layer in which link information is configured overlappingly on the video in operation 720. The electronic device (e.g., the processor 120) may determine whether there is any image portion found after an elapse of a specific time, in operation 725.

According to an embodiment of the present disclosure, the electronic device (e.g., the processor 120) may determine whether an image portion is found by continuously checking the first video frame per second while displaying a transparent layer overlappingly on the video. When there is no image portion found further, the electronic device (e.g., the processor 120) may display the video after removing the layer from the video in operation 730. The electronic device (e.g., the processor 120) may determine whether video playback is terminated in operation 735, and may return to operation 705 and repeat the aforementioned operations until the video playback is terminated.

Figure 8:
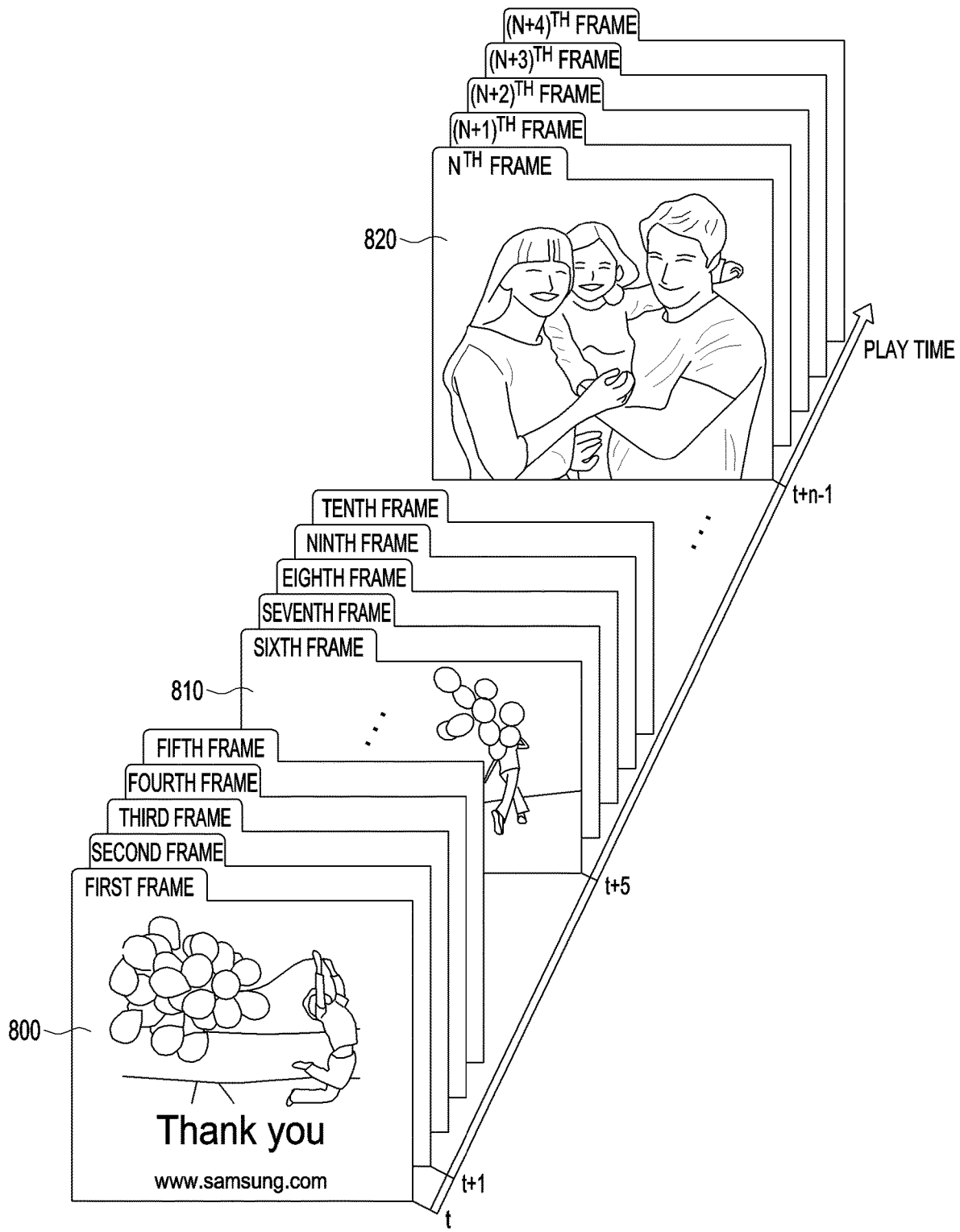
FIG. 8 illustrates an example for describing display and removal of a transparent layer with respect to a video play time according to various embodiments of the present disclosure.

FIG. 8 illustrates an example for describing display and removal of a transparent layer with respect to a video play time according to various embodiments of the present disclosure.

Referring to FIG. 8, a video includes a plurality of frames, and a designated number of frames may be executed per second. A plurality of frames played per second may be arranged along a time axis, and may be sequentially executed over a video play time.

According to an embodiment of the present disclosure, when a designated number of frames per second are executed, the electronic device (e.g., the processor 120) may determine whether link information for communication connection is included in each of first frames 800, 810, and 820 per second. Thus, when a link address is found in a first frame 800 at a time t and a link address is not found in a first frame 810 at a time (t+5), then a layer including a link address activated to enable user's selection may be displayed from the time t to the time (t+5), and the layer including the link information may be removed after the time (t+5).

According to an embodiment of the present disclosure, the link address included in the video may be activated to enable user's selection during a specific time. When user's selection is input within the layer executed in the form of a transparent layer on a video frame from the time t to the time (t+5), movement to link information configured in a link information region in the layer may be performed.

Figure 9A:
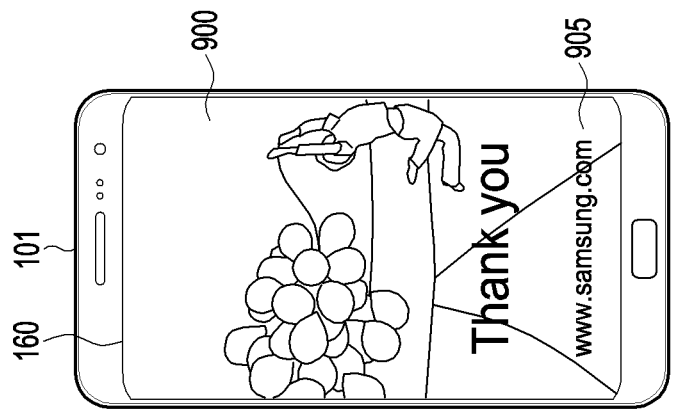
FIGS. 9A, 9B, and 9C illustrate examples of a screen where a transparent layer displayed on a video is removed from the video, according to various embodiments of the present disclosure.
Figure 9B:
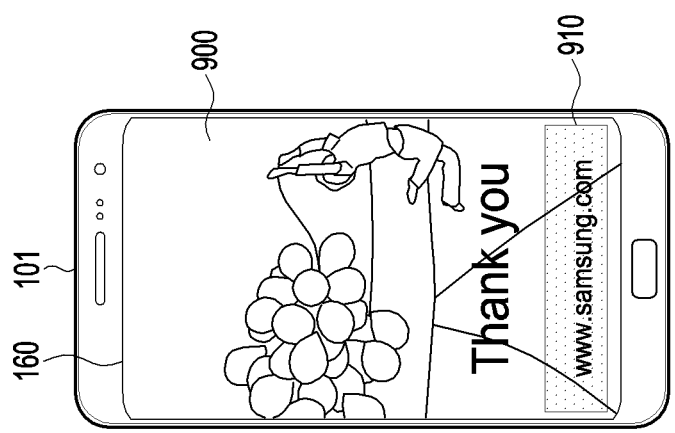
Figure 9C:
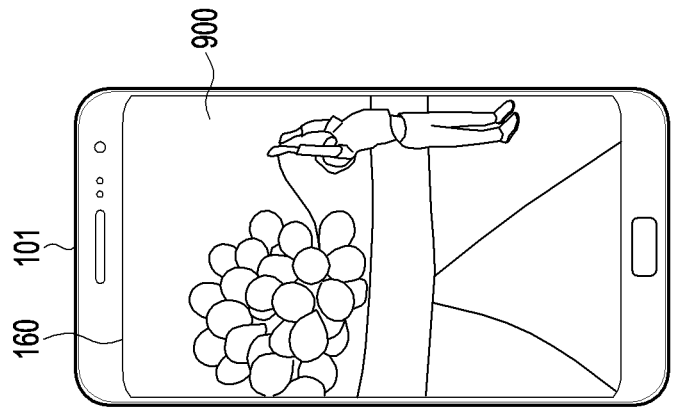

FIGS. 9A through 9C illustrate examples of a screen where a transparent layer displayed on a video is removed from the video, according to various embodiments of the present disclosure.

FIG. 9A illustrates a video screen 900 on which a video including link information 905 is displayed, and for example, when the video screen 900 corresponds to the first frame 800 at the time t in FIG. 8, the link information is included in the first frame 800, such that a layer in which link information is activated may be generated and overlaid-displayed on the second frame from the second frame corresponding to the time (t+1). Thus, as shown in FIG. 9B, a transparent layer including a region 910 where the link information is activated may be overlaid-displayed on the video, and the sixth frame 810 at the time (t+5) may not include link information, such that the video screen 900 from which the layer is removed may be displayed as shown in FIG. 9C.

Figure 10:
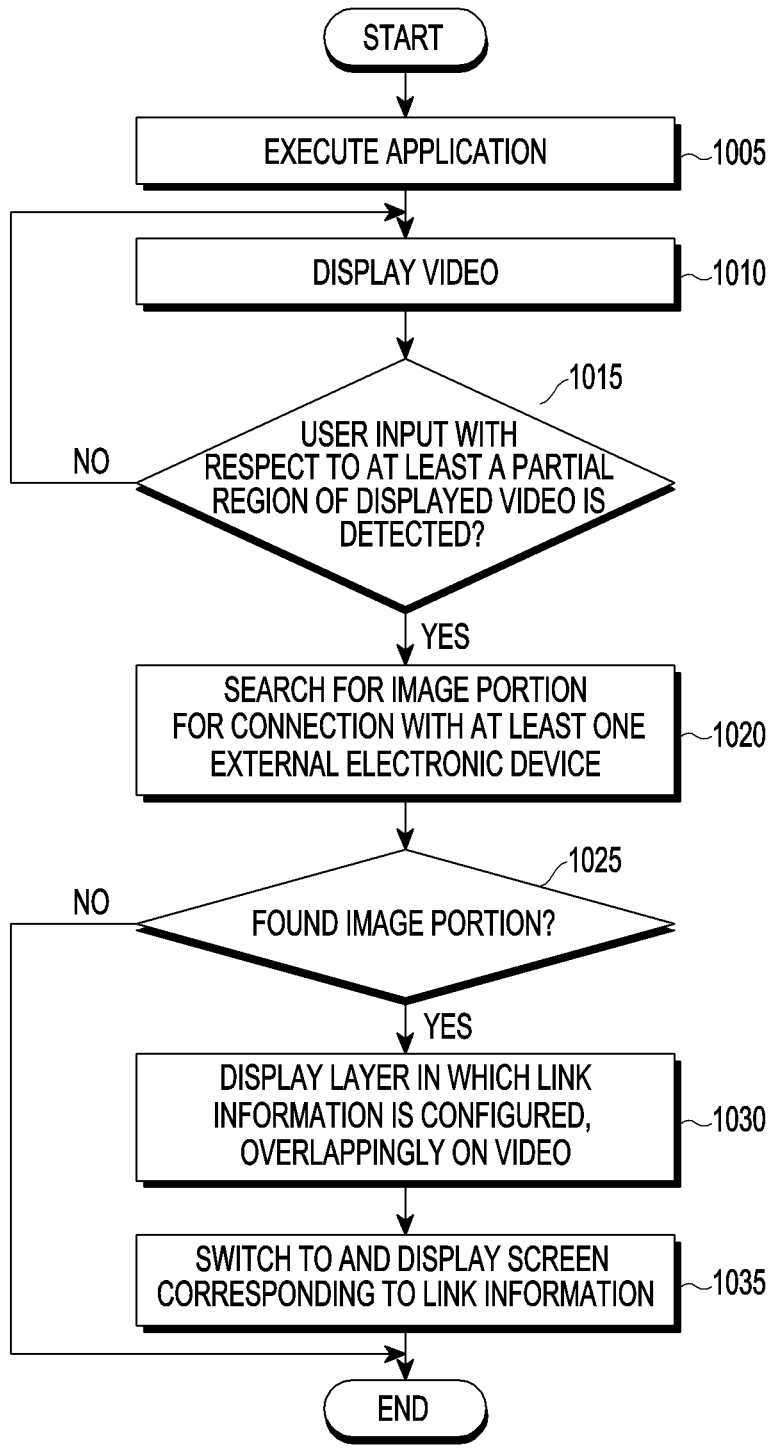
FIG. 10 is an operating flowchart for searching for a link image portion included in a video in response to a user input, according to various embodiments of the present disclosure.

FIG. 10 is an operating flowchart for searching for a link image portion included in a video in response to a user input, according to various embodiments of the present disclosure.

Referring to FIG. 10, the electronic device (e.g., the processor 120) may execute an application automatically or in response to a user input, in operation 1005. An automatically executed application may include a home application, a default application, an application that is set to be automatically executed in environment settings, or an application automatically executed upon occurrence of an event such as message reception, call reception, alarm event occurrence, etc.

According to an embodiment of the present disclosure, for execution of an application in response to a user input, the processor 120 may receive the user input through the I/O interface 150, the display 160, or the communication interface 170. The user may select a button, an icon, or a menu item through the I/O interface 150 or the display 160, input a voice command through a microphone of the I/O interface 150, perform a gesture or a motion input through the camera (not shown) of the electronic device 101, or wirelessly input an execution command of a particular application through the communication interface 170.

According to an embodiment of the present disclosure, an application executed in response to a user input may be an arbitrary application, and may include, but not limited to, a voice recognition application, a schedule management application, a document generation application, a music application, an Internet application, a map application, a camera application, an e-mail application, an image editing application, a search application, a file search application, a video application, a game application, a social network service (SNS) application, a phone application, a message application, and so forth.

In operation 1010, the electronic device (e.g., the processor 120) may display or play the video on the display (e.g., the display 160). For example, the electronic device (e.g., the processor 120) may display an application screen through the display (e.g., the display 160) and play the video in the application screen. The video may be stored in the memory 130 or received from a server (e.g., the server 106) through the communication interface 170. For example, the video may be played on the video application screen. The video may also be displayed on the entire screen of the display (e.g., the display 160). For example, when the user selects the video stored in the memory 130 or the server (e.g., the server 106) during display of the application screen, the electronic device (e.g., the processor 120) may display the video on the application screen or the entire screen.

In operation 1015, the electronic device (e.g., the processor 120) may detect a user input with respect to at least a partial region of the displayed video being played back. When a user input with respect to at least a partial region of the displayed video is detected, the electronic device (e.g., the processor 120) may search for an image portion for connection with at least one external electronic device by performing image recognition with respect to a region where the user input is generated or the entire video screen, so as to determine whether the information for connection with the at least one external electronic device is included in the video in operation 1020.

According to an embodiment of the present disclosure, at a time point when the user clicks the video screen, the electronic device (e.g., the processor 120) may determine whether a video scene corresponding to the time point includes link information such as URL, an e-mail, a phone number, etc. When the video scene corresponding to the time point of clicking the screen by the user includes the link information, the hyperlinked layer may be overlaid-displayed on the video, and the overlaid layer may be removed while performing an operation such as execution of the application corresponding to the link information.

In operation 1025, the electronic device (e.g., the processor 120) may determine whether an image portion is found. When an image portion is found, the electronic device (e.g., the processor 120) may display a layer in which the link information is configured, overlappingly on the video in operation 1030. In operation 1035, the electronic device (e.g., the processor 120) may switch to a screen corresponding to the link information included in the image portion and display the screen.

FIGS. 11A through 11D illustrate examples of a screen corresponding to selection of link information included in a video when a user input is made, according to various embodiments of the present disclosure.

Figure 11A:
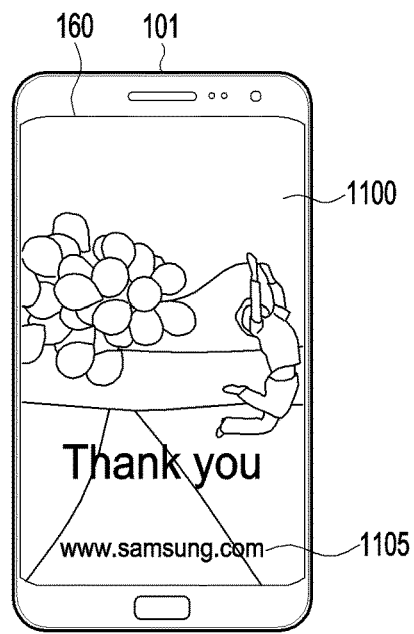
FIGS. 11A, 11B, 11C, and 11D illustrate examples of a screen corresponding to selection of link information included in a video when a user input is made, according to various embodiments of the present disclosure.
Figure 11B:
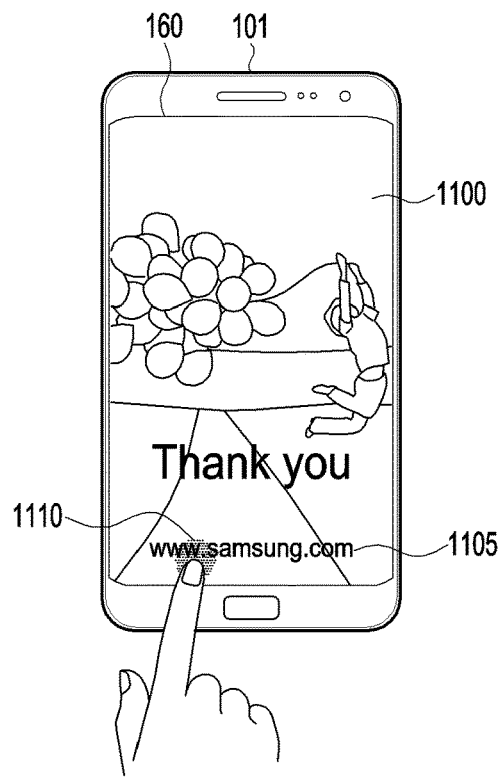

FIG. 11A illustrates a video screen 1100 on which a video including link information 1105 is displayed, and FIG. 11B illustrates a case where the user brings a finger to the screen to select the link information 1105. Without actually selecting the link information, when the finger of the user approaches the screen by a specific distance while not contacting the screen, the electronic device (e.g., the processor 120) may search for at least one object for communication connection in a video frame corresponding to a time point when an event corresponding to the approach occurs. As such, the electronic device (e.g., the processor 120) may process in real time an operation of searching for link information and making a hyperlink as a background operation, in response to a user request in video playback.

Figure 11C:
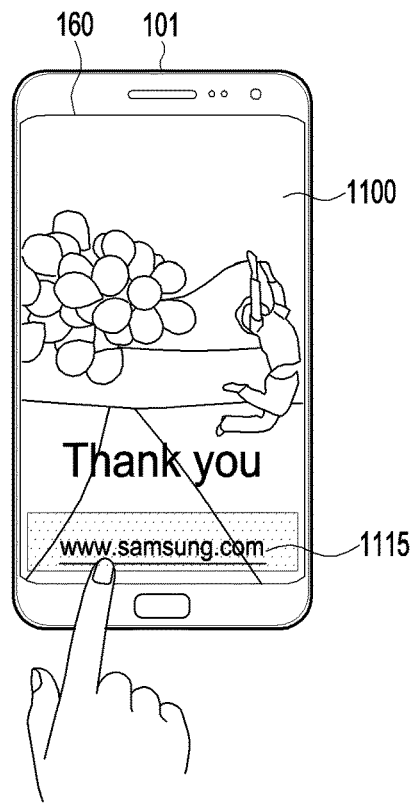
Figure 11D:
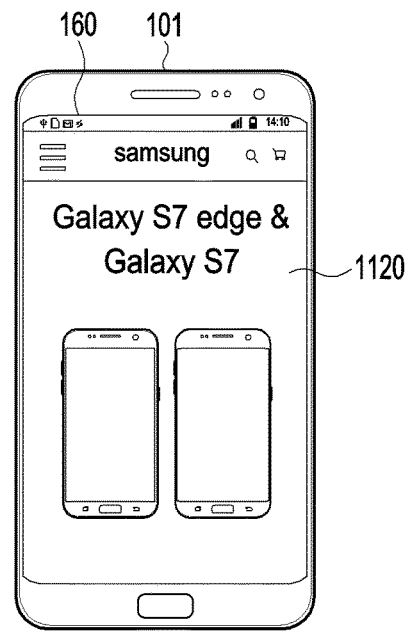

According to an embodiment of the present disclosure, before the user actually selects link information, an activated link information region 1115 may be displayed as shown in FIG. 11C, and upon receipt of a user input with respect to the link information region 1115, the screen may be switched to a screen 1120 corresponding to link information as shown in FIG. 11D.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape), optical media (e.g., compact disc read only memory (CD-ROM) or digital versatile disc (DVD), magneto-optical media (e.g., floptical disk)), an embedded memory, and so forth. The instructions may include a code generated by a compiler or a code executable by an interpreter.

Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to an embodiment of the present disclosure, a storage medium has stored therein instructions which cause, when executed by at least one processor, the at least one processor to perform at least one operation which includes searching for at least one object for connection with at least one external electronic device, the at least one object being included in a video, in playback of the video, displaying information for connection with the at least one external electronic device overlappingly on the video, to correspond to the found at least one object, and performing connection with the at least one external electronic device in response to a user input.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

What is claimed is:
1. An electronic device comprising:
a communication interface;
a touch screen; and
a processor operatively connected with the touch screen, wherein the processor is configured to control the electronic device to:

play a video on the touch screen;
search for at least one object related to at least one external electronic device, the at least one object being included in at least one frame among a plurality of frames of the video, during the playing of the video on the touch screen;
obtain information of a found at least one object for connection with the at least one external electronic device;
display the information for connection with the at least one external electronic device overlappingly on the video, to correspond to the found at least one object;
receive a touch input for the information for connection with the at least one external electronic device; and
connect to the at least one external electronic device based on the information for connection with the at least one external electronic device through the communication interface in response to the touch input,
wherein, when two or more objects are found in one frame, the processor is configured to control the electronic device to display information for connection with a first external electronic device corresponding to a first object in a position corresponding to the first object and information for connection with a second external electronic device corresponding to a second object in a position corresponding to the second object overlappingly on the video being played back.

2. The electronic device of claim 1, wherein the processor is configured to control the electronic device to include information of the found at least one object for connection with the at least one external electronic device on a first layer and display the first layer overlappingly on the video being played.

3. The electronic device of claim 1, wherein the information for connection with the at least one external electronic device comprises at least one of a webpage address, a phone number, an e-mail, or a logo.

4. The electronic device of claim 2, wherein the processor is configured to control the electronic device to display a screen corresponding to connection with the at least one external electronic device in response to the touch input for the information for connection with the at least one external electronic device.

5. The electronic device of claim 1, wherein the processor is configured to control the electronic device to search for the at least one object in a selected frame at designated intervals in playing of the video.

6. The electronic device of claim 2, wherein the processor is configured to control the electronic device to display the first layer overlappingly on the video being played, and remove the first layer when the at least one object is not found.

7. The electronic device of claim 1, wherein the processor is configured to control the electronic device to search for the at least one object in a frame corresponding to selection among frames included in the video, in playing of the video.

8. The electronic device of claim 5, wherein the processor is configured to control the electronic device to extract a text corresponding to the information for connection with the at least one external electronic device, based on an image recognition algorithm.

9. The electronic device of claim 1, wherein the processor is configured to control the electronic device to display the information of the found at least one object for connection with the at least one external electronic device on the video using a selectable visual element.

10. The electronic device of claim 1, wherein the processor is configured to control the electronic device to set connection with an external electronic device corresponding to an object selected by the touch input from among the at least one object.

11. A method of displaying a video-related service, the method comprising:
playing a video on a touch screen of an electronic device;
searching for at least one object for connection with at least one external electronic device, the at least one object being included in at least one frame among a plurality of frames of the video, during the playing of the video;
obtaining information of a found at least one object for connection with the at least one external electronic device;
displaying the information for connection with the at least one external electronic device overlappingly on the video, to correspond to the found at least one object;
receiving a touch input for the information for connection with the at least one external electronic device; and
performing connection with the at least one external electronic device in, response to the touch input,
wherein the displaying of the information overlappingly on the video comprises:
when two or more objects are found in one frame, displaying information for connection with a first external electronic device corresponding to a first object in a position corresponding to the first object and information for connection with a second external electronic device corresponding to a second object in a position corresponding to the second object overlappingly on the video being played back.

12. The method of claim 11, wherein the displaying of the information overlappingly on the video comprises:
providing a first layer comprising the information for connection with the at least one external electronic device in a position corresponding to the found at least one object; and
displaying the first layer overlappingly on the video.

13. The method of claim 11, wherein the information for connection with the at least one external electronic device comprises at least one of a webpage address, a phone number, an e-mail, or a logo.

14. The method of claim 12, wherein the performing of connection with the at least one external electronic device comprises displaying a screen corresponding to connection with the at least one external electronic device in response to the touch input for the information for connection with the at least one external electronic device.

15. The method of claim 11, wherein the searching for of the at least one object for connection with the at least one external electronic device comprises searching for at least one object in a selected frame at designated intervals in the playing of the video.

16. The method of claim 12, further comprising:
displaying the first layer overlappingly on the video when the at least one object is found; and
removing the first layer when the at least one object is not found.

17. The method of claim 11, wherein the searching for of the at least one object for connection with the at least one external electronic device comprises searching for at least one object in a frame corresponding to user's selection among frames included in the video, in the playing of the video.

18. The method of claim 11, wherein the information for connection with the at least one external electronic device comprises a text extracted corresponding to the found at least one object, based on an image recognition algorithm.

19. A non-transitory storage medium having stored therein instructions which cause, when executed by at least one processor, the at least one processor to perform at least one operation which comprises:

playing a video on a touch screen of an electronic device;

searching for at least one object for connection with at least one external electronic device, the at least one object being included in at least one frame among a plurality of frames of the video, during the playing of the video;

obtaining information of a found at least one object for connection with the at least one external electronic device;

displaying the information for connection with the at least one external electronic device overlappingly on the video, to correspond to the found at least one object;

receiving a touch input for the information for connection with the at least one external electronic device; and performing connection with the at least one external electronic device in response to the touch input, wherein the displaying of the information overlappingly on the video comprises:

when two or more objects are found in one frame, displaying information for connection with a first external electronic device corresponding to a first object in a position corresponding to the first object and information for connection with a second external electronic device corresponding to a second object in a position corresponding to the second object overlappingly on the video being played back.

* * * * *